United States Patent
Navasivasakthivelsamy et al.

(10) Patent No.: US 11,089,066 B2
(45) Date of Patent: Aug. 10, 2021

(54) SYSTEM AND METHOD FOR DYNAMIC MEDIUM ACCESS CONTROL (MAC) RELATING TO A VIRTUALIZATION ENVIRONMENT

(71) Applicant: Nutanix, Inc., San Jose, CA (US)

(72) Inventors: Arunkumar Navasivasakthivelsamy, Redmond, WA (US); Gregory A. Smith, Oakland, CA (US); Uzui Li, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 103 days.

(21) Appl. No.: 16/657,946

(22) Filed: Oct. 18, 2019

(65) Prior Publication Data

US 2020/0053132 A1 Feb. 13, 2020

Related U.S. Application Data

(63) Continuation-in-part of application No. 16/510,811, filed on Jul. 12, 2019, now Pat. No. 11,005,896.
(Continued)

(51) Int. Cl.
*H04L 29/06* (2006.01)
*G06F 9/455* (2018.01)
(Continued)

(52) U.S. Cl.
CPC ........ *H04L 65/102* (2013.01); *G06F 9/45558* (2013.01); *H04L 12/46* (2013.01);
(Continued)

(58) Field of Classification Search
CPC ... H04L 65/102; H04L 12/46; H04L 12/4625; H04L 12/4633; H04L 12/4637;
(Continued)

(56) References Cited

U.S. PATENT DOCUMENTS 8,097,747 B2 * 1/2012 Yao .................. C07F 9/301
558/87
8,549,518 B1 10/2013 Aron et al.
(Continued)

FOREIGN PATENT DOCUMENTS

EP 3197107 A1 * 7/2017 ......... H04L 12/4633

OTHER PUBLICATIONS

Cano, Ignacio, et al. "Curator: Self-Managing Storage for Enterprise Clusters" (Mar. 27, 2017), from https://www.usenix.org/conference/nsdi17/.
(Continued)

*Primary Examiner* — Mewale A Ambaye
(74) *Attorney, Agent, or Firm* — Foley & Lardner LLP

(57) ABSTRACT

An illustrative embodiment disclosed herein is an apparatus including a processor having programmed instructions to determine that a first packet, received from a first VM on a first host, has a destination address associated with a second VM on the first host, send the first packet to a service-focused bridge, generate a rule to redirect the first packet to the second VM based on the destination address, and generate execute the rule in response to receiving the first packet from the service-focused bridge.

18 Claims, 4 Drawing Sheets

Related U.S. Application Data which is a continuation of application No. 15/835,607, filed on Dec. 8, 2017, now Pat. No. 10,356,131.

(60) Provisional application No. 62/432,126, filed on Dec. 9, 2016.

(51) Int. Cl.

| | | |
|---|---|---|
| *H04L 12/46* | (2006.01) | |
| *H04L 12/715* | (2013.01) | |
| *H04L 12/751* | (2013.01) | |
| *H04L 12/64* | (2006.01) | |

(52) U.S. Cl.
CPC ...... *H04L 12/4625* (2013.01); *H04L 12/4633* (2013.01); *H04L 12/4637* (2013.01); *H04L 45/04* (2013.01); *H04L 45/10* (2013.01); *H04L 63/0227* (2013.01); *H04L 65/1069* (2013.01); *G06F 2009/45595* (2013.01); *H04L 12/6418* (2013.01); *H04L 45/02* (2013.01)

(58) Field of Classification Search
CPC ..... H04L 45/04; H04L 45/10; H04L 63/0227; H04L 65/1069; H04L 12/6418; H04L 45/02; H04L 49/00; H04L 12/4616; H04L 12/1818; H04L 67/104; H04L 12/4641; G06F 9/45558; G06F 2009/45595; G06F 2009/45575; G06F 2009/4557; G06F 13/4004

See application file for complete search history.

(56) References Cited

U.S. PATENT DOCUMENTS

| | | | |
|---|---|---|---|
| 8,601,473 B1 | 12/2013 | Aron et al. | |
| 8,850,130 B1 | 9/2014 | Aron et al. | |
| 9,772,866 B1 | 9/2017 | Aron et al. | |
| 2011/0299413 A1 | 12/2011 | Chatwani et al. | |
| 2012/0063306 A1 | 3/2012 | Sultan et al. | |
| 2013/0007740 A1* | 1/2013 | Kikuchi | G06F 11/301 718/1 |
| 2013/0044641 A1 | 2/2013 | Koponen et al. | |
| 2014/0082616 A1* | 3/2014 | Kurita | H04L 49/70 718/1 |
| 2014/0092907 A1 | 4/2014 | Sridhar et al. | |
| 2015/0096007 A1* | 4/2015 | Sengupta | H04L 63/0218 726/11 |
| 2015/0103841 A1 | 4/2015 | Yang et al. | |
| 2016/0094365 A1 | 3/2016 | Subramaniyam et al. | |
| 2016/0094366 A1 | 3/2016 | Wang et al. | |
| 2016/0119219 A1 | 4/2016 | Fang et al. | |
| 2016/0308790 A1 | 10/2016 | Jiang et al. | |
| 2017/0118043 A1 | 4/2017 | Hao et al. | |
| 2017/0324645 A1 | 11/2017 | Johnsen et al. | |
| 2018/0048716 A1 | 2/2018 | Madhayyan et al. | |
| 2018/0321964 A1 | 11/2018 | Tsuji | |
| 2019/0095243 A1* | 3/2019 | Wu | G06F 9/4856 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

* cited by examiner

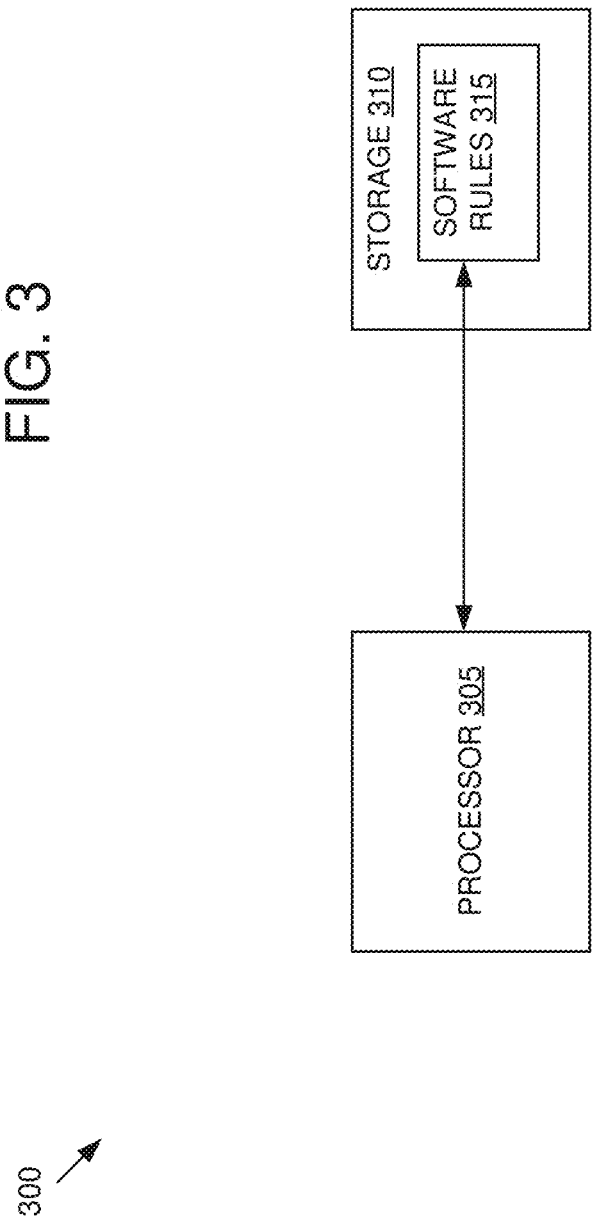

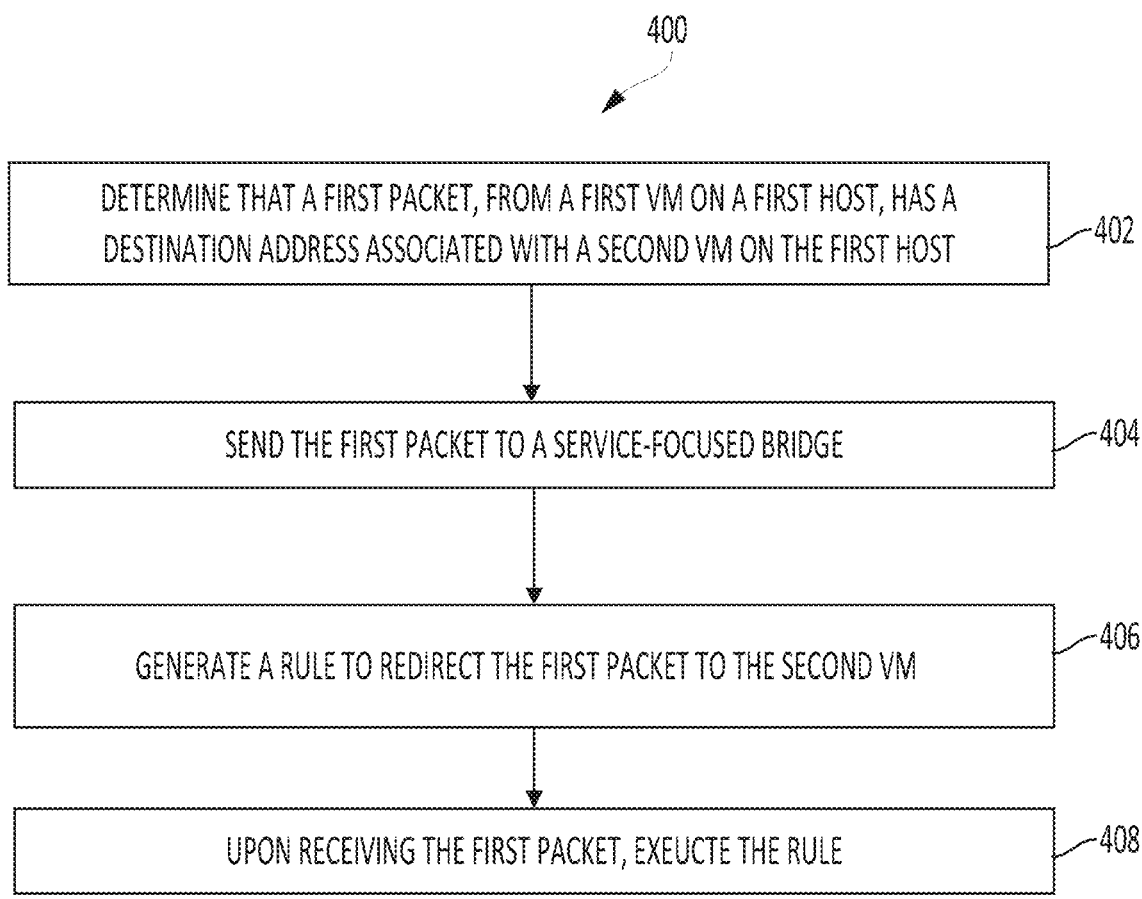

SYSTEM AND METHOD FOR DYNAMIC MEDIUM ACCESS CONTROL (MAC) RELATING TO A VIRTUALIZATION ENVIRONMENT

CROSS-REFERENCE TO RELATED APPLICATION

This application is a continuation-in-part of and claims priority under 35 U.S. § 120 from U.S. patent application Ser. No. 16/510,811, filed Jul. 12, 2019, titled "SERVICE CHAINING FOR MULTIPLE UPLINK BRIDGES," the entire contents of which are incorporated herein by reference for all purposes. Application Ser. No. 16/510,811 is a continuation of and claims priority under 35 U.S. § 120 from U.S. paatent application Ser. No. 15/835,607, filed Dec. 8, 2017, titled "SERVICE CHAINING FOR MULTIPLE UPLINK BRIDGES," the entire contents of which are incorporated herein by reference for all purposes. Application Ser. No. 15/835,607 claims priority under 35 U.S. § 119(e) from U.S. Provisional Application No. 62/432126, filed Dec. 9, 2016, titled "SERVICE CHAINING FOR MULTIPLE UPLINK BRIDGES," the entire contents of which are incorporated herein by reference for all purposes.

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

Aspects of the present disclosure relate generally to a virtualization environment, and more particularly to dynamic mac learning.

An illustrative embodiment disclosed herein is an apparatus including a processor having programmed instructions to determine that a first packet, received from a first VM on a first host, has a destination address associated with a second VM on the first host, send the first packet to a service-focused bridge, generate a rule to redirect the first packet to the second VM based on the destination address, and execute the rule in response to receiving the first packet from the service-focused bridge.

Another illustrative embodiment disclosed herein is a method including determining, by a processor, that a first packet, received from a first VM on a first host, has a destination address associated with a second VM on the first host, sending, by the processor, the first packet to a service-focused bridge, generating, by the processor, a rule to redirect the first packet to the second VM based on the destination address, and executing, by the processor, the rule in response to receiving the first packet from the service-focused bridge.

Another illustrative embodiment disclosed herein is a non-transitory computer readable storage medium with computer-executable instructions embodied thereon that, when executed by a processor, causes the processor to perform a process including determining that a first packet, received from a first VM on a first host, has a destination address associated with a second VM on the first host, sending the first packet to a service-focused bridge, generating a rule to redirect the first packet to the second VM based on the destination address, and executing the rule in response to receiving the first packet from the service-focused bridge.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 is a block diagram of an OVS bridge, in accordance with some embodiments of the present disclosure.

FIG. 4 is a flow chart of a method for sending network traffic, in accordance with some embodiments of the present disclosure.

Figure 1:
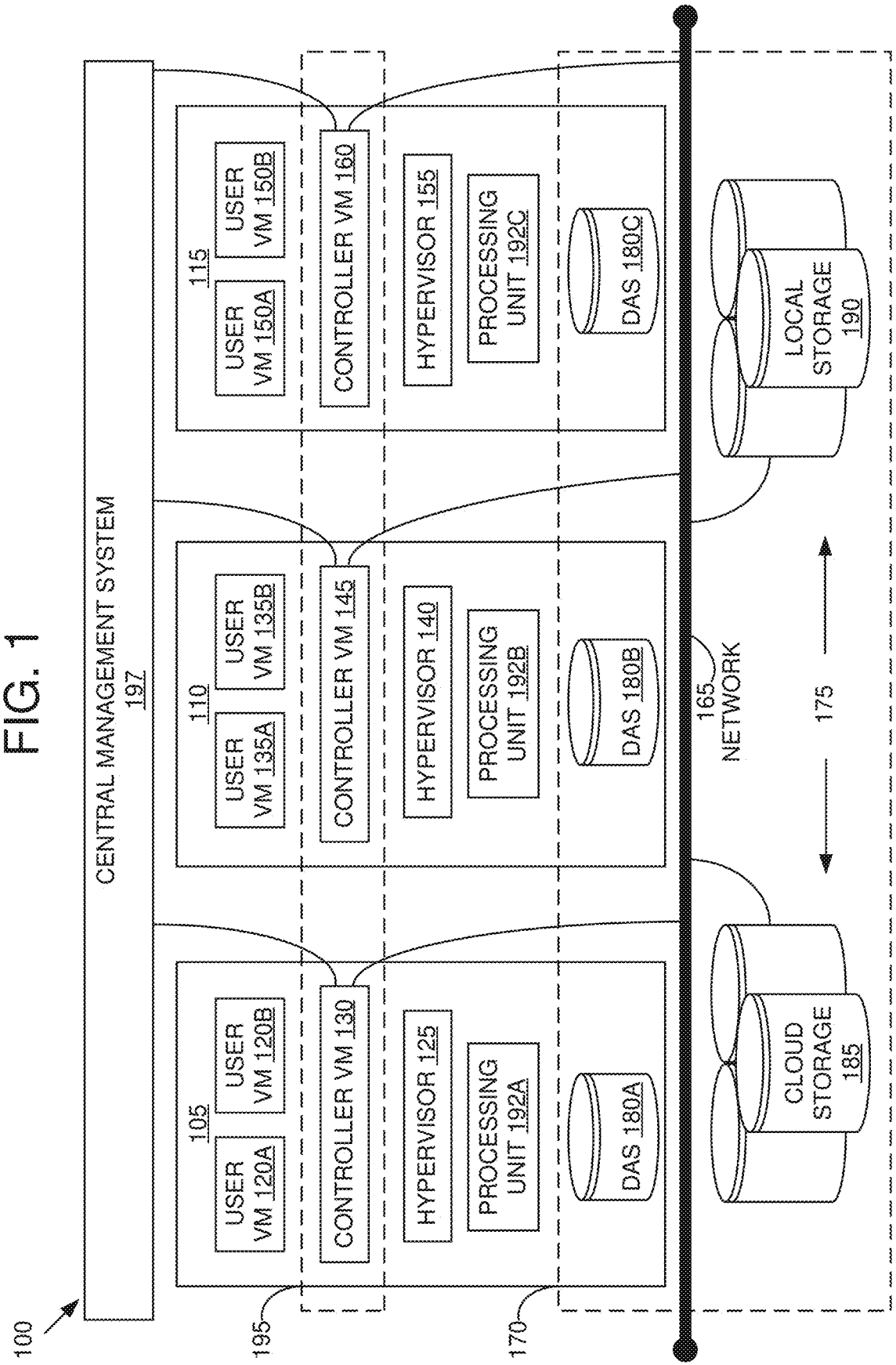
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Service-focused bridges on OVS (open v-switch) bridge chains are used to manage network traffic between virtual machines (VMs) on a host of a virtualization environment and external servers separate from the host. For example, the service-focused bridges handle enforcement and management of network security rules, to direct traffic to/from different network functions, and to perform network functions such as firewalling, load balancing, and traffic analytics. However, in conventional systems, such as standard layer 2 (L2) bridge chains, when network traffic is being sent between the VMs on the same host, the local bridge couples the VMs directly and the service-focused bridges are bypassed, resulting in less utilization of network and security services in intra-host network traffic communication and, thus, a lower quality of service (QoS) and a higher susceptibility to DDOS attacks. Thus, there exists a technical problem to utilize the service-focused bridges for intra-host network traffic while being backwards compatible with conventional bridge chains (e.g., having the ability to send traffic using standard L2 bridge chains between VMs on one host or between hosts and external servers).

Some embodiments of the present disclosure offer a technical solution to the technical problem. That is, some embodiments of the present disclosure include a system and method for implementing OpenFlow rules to facilitate application of service-focused bridges to intra-host network traffic communication. In some embodiments, a local bridge receives, from a first VM, a packet destined for a second VM on the same host. Upon receiving the packet, the local bridge automatically sends the packet to the multiplexer (MUX) bridge for processing by the service-focused bridges, in some embodiments. In some embodiments, the local bridge generates a dynamic rule that, upon receiving the packet again, the packet is to be sent to the second VM. In some embodiments, upon receiving the packet again, the local bridge executes the dynamic rule, causing the packet to be sent to the second VM. Advantageously, some embodiments of the present disclosure utilize service-focused bridges for intra-host (e.g., the first VM to the second VM) network traffic communication, resulting in a greater QoS and less susceptibility to DDOS attacks. Furthermore, some embodiments of the present disclosure utilize service-focused bridges for intra-host network traffic communication while being backwards compatible with standard L2 bridge chains. Thus, no new hardware or modification of hardware is required to implement either standard L2 bridge chains or bridge chains for intra-host network traffic communication via service-focused bridges.

Virtualization Technology And Environment

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller VM 145, and the third node 115 includes user VMs 150A and 150B (collectively referred to herein as "user VMs 150"), a hypervisor 155, and a controller VM 160. The controller VM 130, the controller VM 145, and the controller VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage (NAS) 175 and direct-attached storage (DAS) 180A, 180B, and 180C (collectively referred to herein as DAS 180). The NAS 175 is accessible via the network 165 and, in some embodiments, may include cloud storage 185, as well as local storage area network 190 (also referred to as networked storage 190). In contrast to the NAS 175, which is accessible via the network 165, the DAS 180 includes storage components that are provided internally within each of the first node 105, the second node 110, and the third node 115, respectively, such that each of the first, second, and third nodes may access its respective DAS without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller VM 130, the controller VM 145, and the controller VM 160, and/or the hypervisor 125, the hypervisor 140, and the hypervisor 155. One or more of the first node 105, the second node 110, and the third node 115 may be organized in a variety of network topologies.

Also, the first node 105 may include one or more processing units 192A, the second node 110 may include one or more processing units 192B, and the third node 115 may include one or more processing units 192C. The processing units 192A, 192B, and 192C are collectively referred to herein as the processing units 192. The processing units 192 may be configured to execute instructions. The instructions may be carried out by a special purpose computer, logic circuits, or hardware circuits of the first node 105, the second node 110, and the third node 115. The processing units 192 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 192, thus, execute an instruction, meaning that they perform the operations called for by that instruction.

The processing units 192 may be operably coupled to the storage pool 170, as well as with other elements of the first node 105, the second node 110, and the third node 115 to receive, send, and process information, and to control the operations of the underlying first, second, or third node. The processing units 192 may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. The RAM may be stand-alone hardware such as RAM chips or modules. Further, each of the processing units 192 may include a single stand-alone processing unit, or a plurality of processing units that use the same or different processing technology.

With respect to the storage pool 170 and particularly with respect to the DAS 180, each of the DAS 180 may include a variety of types of memory devices. For example, in some embodiments, one or more of the DAS 180 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 175 may include any of a variety of network accessible storage (e.g., the cloud storage 185, the local storage area network 190, etc.) that is suitable for use within the virtual computing system 100 and accessible via the network 165. The storage pool 170, including the NAS 175 and the DAS 180, together form a distributed storage system configured to be accessed by each of the first node 105, the second node 110, and the third node 115 via the network 165, the controller VM 130, the controller VM 145, the controller VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g., Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller VM 130, the controller VM 145, and the controller VM 160. The controller VM 130, the controller VM 145, and the controller VM 160 are configured to communicate with each other via the network 165 to form a distributed system 195. Each of the controller VM 130, the controller VM 145, and the controller VM 160 may also include a local management system configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller VM 130, the controller VM 145, the controller VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller VM (e.g., the controller VM 130, the controller VM 145, or the controller VM 160, respectively) on the underlying node (e.g., the first node 105, the second node 110, or the third node 115, respectively). Upon receiving the input/output request, that controller VM may direct the input/output request to the controller VM (e.g., one of the controller VM 130, the controller VM 145, or the controller VM 160) of the leader node. In some cases, the controller VM that receives the input/output request may itself be on the leader node, in which case the controller VM does not transfer the request, but rather handles the request itself.

The controller VM of the leader node may fulfil the input/output request (and/or request another component within the virtual computing system 100 to fulfil that request). Upon fulfilling the input/output request, the controller VM of the leader node may send a response back to the controller VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments the virtual computing system 100 includes a central management system 197 that is configured to manage and control the operation of the various clusters in the virtual computing system. In some embodiments, the central management system 197 may be configured to communicate with the local management systems on each of the controller VM 130, the controller VM 145, the controller VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Dynamic MAC Learning

Figure 2:
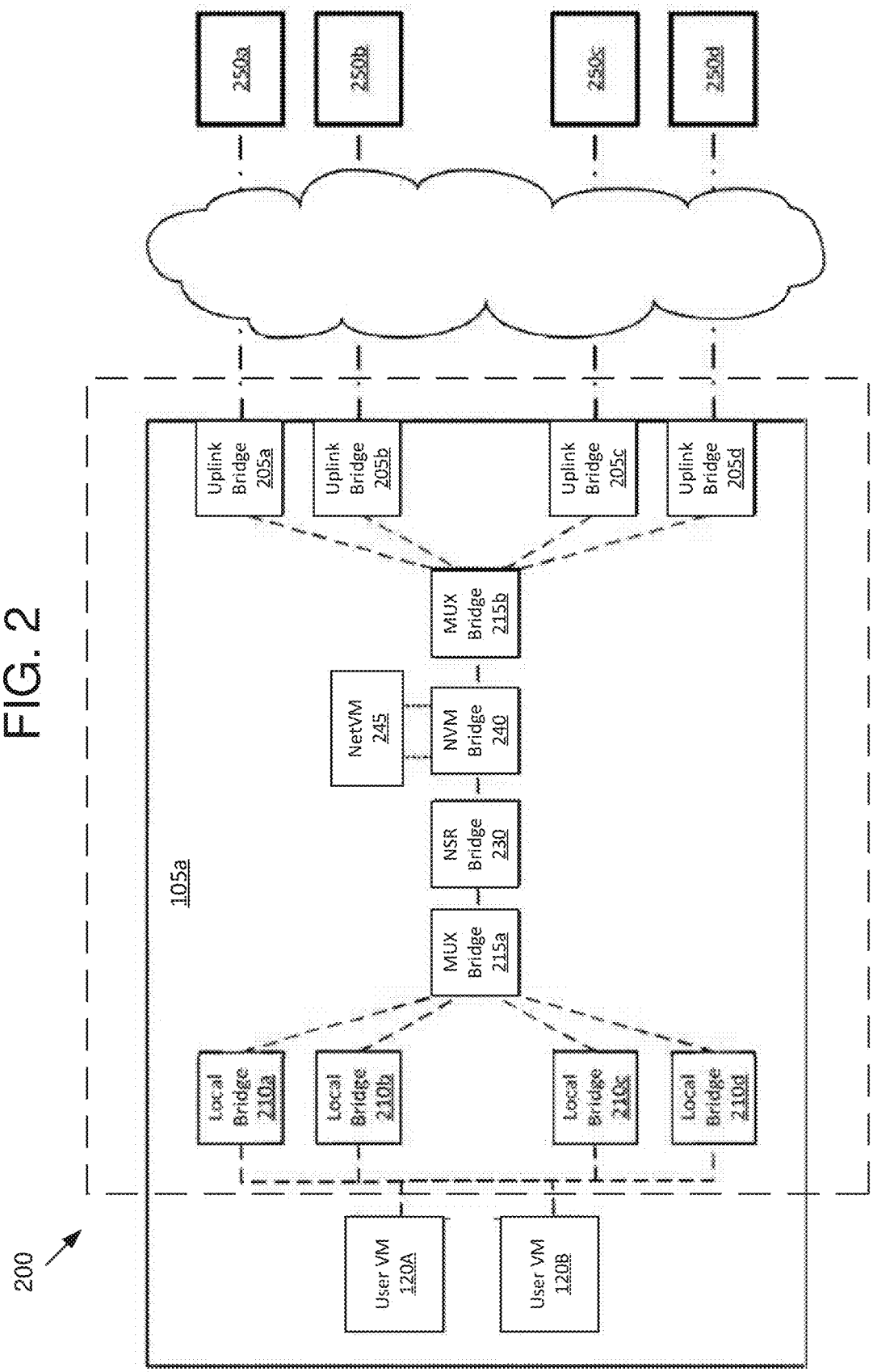
FIG. 2 is a block diagram of an OVS bridge chain, in accordance with some embodiments of the present disclosure.

Referring now to FIG. 2, a block diagram of a virtual switch (e.g., an open vswitch, or OVS) bridge chain 200 is shown, in accordance with some embodiments of the present disclosure. Without loss of generality, the virtual switch bridge chain 200 is referred to as the OVS bridge chain 200 herein. The OVS bridge chain 200 can be implemented as part of a virtualization environment. In some embodiments, the OVS bridge chain 200 is located in the host machine 105. In some embodiments, the OVS bridge chain 200 couples one or more user VMs (e.g., the user VMs 120A and 120B) to one or more external servers 250a-250d. The OVS bridge chain 200 includes local bridges 210a-210d, MUX bridges 215a-215b, service-focused bridges (network security rules ("NSR")) bridge 230 and network function ("NVM") Bridge 240), NetVM 245, and uplink bridges 205a-205d, in some embodiments.

In some embodiments, the local bridges 210a-210d couple network traffic (e.g., one or more packets) from clients (e.g., the user VMs 120A and 120B) to each other and to the MUX bridge 215a. In some embodiments, the first multiplexing bridge 215a combines traffic going from the local bridges 210a-210d to service-focused bridges, as well has splitting traffic from the service-focused bridges to the local bridges 210a-210d. In some embodiments, the NSR Bridge 230 handles enforcement and management of network security rules and provides logic to filter traffic based on configurable network security rules. In some embodiments, the NVM Bridge 240 directs traffic to/from different network functions, such as the NetVM 245. In some embodiments, the NVM Bridge 240 couples traffic to the second multiplexing bridge 215b.

In some embodiments, the NetVM 245 provides certain network functions, such as firewall services, load balancing, or traffic analytics. The NetVM 245 can passively (e.g., in the background) monitor the traffic (e.g., as would be appropriate for functions such as traffic analytics). The NetVM 245 can provide a network interface ("NIC") for each of the uplink bridges 205a-205d. In some embodiments, the second multiplexing bridge 215b combines traffic going from the service-focused bridges to the uplink bridges 205a-205d and splits traffic going from the uplink bridges 205a-d to the service-focused bridges. In some embodiments, the uplink bridges 205a-205d handle outgoing and incoming network traffic exchanged with a plurality of external servers 250a-250d. In some embodiments, each uplink bridge 205 can have a corresponding local bridge 210. In some embodiments, the external servers 250a-250d are local (e.g., in a same LAN). In some embodiments, the external servers 250a-250d are remote (e.g., in a different LAN that is connected to the host 105 through a network).

Referring now to FIG. 3, a block diagram of a virtual switch 300 (e.g., an OVS bridge 300) is shown, in accordance with some embodiments of the present disclosure. Without loss of generality, the virtual switch 300 is referred to as the OVS bridge 300 herein. The OVS bridge 300 is an instance of, or is included in, one or more of the local bridges 210a-210d, the MUX bridges 215a-b, NSR bridge 230, NVM bridge 240, or uplink bridges 205a-205d, in one or more embodiments. The OVS bridge 300 is a software (e.g., open source OpenFlow) capable apparatus (e.g., virtual switch) that can be used with hypervisors to interconnect VMs within host and VMs between different hosts across a single network or across multiple networks, in some embodiments. Thus, the OVS bridge chain is a software defined network, in some embodiments. In some embodiments, one or more of the OVS bridges are layer 2 (L2) bridges. In some embodiments, one or more of the OVS bridges are layer 3 (L3) bridges.

Each OVS bridge includes a processor 305 and a storage 310. The processor 305 includes hardware for executing instructions, such as those making up a computer program. For example, the processor 305 can retrieve (or fetch) the instructions from an internal register, an internal cache, memory, or the storage 310. The processor 305 can decode and execute the instructions and write one or more results in the internal register, the internal cache, the memory, or the storage 310. The storage 310 may include static storage (e.g., ROM or flash) or dynamic storage (e.g., magnetic or optical). The storage 310 may include computer-readable non-transitory storage. The computer-readable non-transitory storage can include one or more semiconductor based or other integrated circuits (ICs) (such, as for example, field-progranlmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, any other suitable computer-readable non-transitory storage media, or any suitable combination thereof. The storage 310 (e.g., the computer-readable non-transitory storage) includes, in some embodiments, software (e.g., OpenFlow) rules 315. Without loss of generality, software rules 315 is referred to as OpenFlow rules 315 herein. In some embodiments, the processor can execute the OpenFlow rules 315. The OpenFlow rules 315 are instructions that, when executed, determine what action an OVS bridge including the OpenFlow rules 315 is going to perform.

Software (e.g., OpenFlow) rules 315 include rules. Without loss of generality, software is referred to as OpenFlow herein. A rule comprises a priority, a criteria, and an action. The priority is used to determine which rule to execute first. A criteria is evaluated. If the criteria is met, an action is performed. Examples of actions include sending a packet, modifying a packet, dropping a packet, adding a new rule, overriding a rule, or refreshing a rule.

Referring now to FIG. 4, a flow chart of a 400 method for sending network traffic, in accordance with some embodiments of the present disclosure. The method 400 may be implemented using, or performed by, one or more virtual switches, or one or more processors associated with the one or more virtual switches, such as the processor 305, which are detailed herein with respect to FIG. 2 and FIG. 3. The one or more virtual switches includes one or more OVS bridges. The one or more virtual switches includes one or more local bridges, such as the local bridge 210a. Additional, fewer, or different operations may be performed in the method 400 depending on the embodiment.

A local bridge, such as the local bridge 210a, determines that a first packet has a destination address associated with a second user VM, such as the user VM 120B, on a first host (402). The local bridge receives the first packet from a first user VM, such as the user VM 120A, on the first host, such as the host 105a. In some embodiments, the destination address is at least one of a medium access control (MAC) address and a virtual local area network (VLAN) identifier (ID). The local bridge sends the first packet to one of a service-focused bridge, such as the NSR bridge 230 or the NVM bridge 240, or a MUX bridge, such as the MUX bridge 215a (404). In some embodiments, the local bridge has a default software (e.g., OpenFlow) rule that the local bridge sends any packet to one of the serviced focused bridges or the MUX bridge 215a. Upon receiving the first packet from the first user VM, the local bridge identifies, reads, or decodes the default rule, and executes the default rule. In some embodiments, the local bridge sends the first packet to the MUX bridge responsive to executing the default rule to send the first packet to the service-focused bridge.

The local bridge generates a software rule that upon a condition being met, the local bridge will redirect the first packet to the second user VM (406). In some embodiments, the software rule generated by the local bridge is generated responsive to sending the first packet to one of the service-focused bridges or the MUX bridge. In some embodiments, the rule includes a criteria and an action. In some embodiments, the criteria is receiving the first packet. In some embodiments, the condition is that the local bridge receives the first packet a second time. In some embodiments, the condition is that the local bridge receives the first packet from one of the service-focused bridges or the MUX bridge. In some embodiments, the action is redirecting the first packet to a VM having the destination address (e.g., the second user VM). Upon receiving the first packet (e.g., from the service-focused bridge), the local bridge executes the rule (408). Thus, the local bridge redirects the first packet to the second user VM. In some embodiments, upon receiving the first packet, the local bridge identifies, reads, or decodes the rule, and then executes the rule.

In some embodiments, each of the bridges in a bridge chain (e.g., the MUX bridge, etc.) associated with or coupled to the local bridge have software rules. In some embodiments, the MUX bridge has a software rule to forward the first packet from the local bridge to a first service-focused bridge (e.g., the NSR bridge 230). In some embodiments, the first service-focused bridge, after applying a first portion of the network and security services to the first packet, has a software rule to, if the first packet is destined for one of the user VMs of the first host, redirect the first packet to the MUX bridge. In some embodiments, the first service-focused bridge, after applying the first portion of the network and security services to the first packet, has a software rule to forward the first packet from the MUX bridge to a second service-focused bridge (e.g., the NVM bridge 240). In some embodiments, the second service-focused bridge, after applying a second portion of the network and security services to the first packet, has a software rule to, if the first packet is destined for one of the user VMs of the first host, redirect the first packet to the first service-focused bridge.

In some embodiments, the second service-focused bridge has a software rule to forward the first packet from the first service-focused bridge to a second MUX bridge, such as the MUX bridge 215b. In some embodiments, the second MUX bridge has a software rule to, if the first packet is destined for one of the user VMs of the first host, redirect to the first packet from the second service-focused bridge to the second service-focused bridge. In some embodiments, the second MUX bridge has a software rule to forward the first packet from the second service-focused bridge to an uplink bridge, such as the uplink bridge 205a. In some embodiments, the uplink bridge has a software rule to, if the first packet is destined for one of the user VMs of the first host, redirect to the first packet from the second MUX bridge to the second MUX bridge.

In some embodiments, the second MUX bridge has a software rule to forward the first packet from the uplink bridge to the second service-focused bridge. In some embodiments, the second service-focused bridge has a software rule to forward the first packet from the second MUX bridge to the first service-focused bridge. In some embodiments, the first service-focused bridge has a software rule to forward the first packet from the second service-focused bridge to the MUX bridge. In some embodiments, the MUX bridge has a software rule to forward the first packet from the first service-focused bridge to the local bridge.

In some embodiments, rule generated by the local bridge may expire if the criteria is not met after a predetermined time. If the local bridge receives the first packet after the generated rule expires, then lower priority rules or default rules apply, in some embodiments. For example, the default rule may be to send the first packet to the VM with the destination address, or the VM with the source address, or to discard the first packet and send an error to the VM with the source address. In some embodiments, the user VM can refresh the expired rule. In some embodiments, the user VM can resend the first packet to refresh the expired rule. In some embodiments, the user VM can send an explicit command to refresh the expired rule.

In some embodiments, the local bridge maintains a data structure for rules. For example, the data structure may include a mapping from a packet identifier or destination address to one or more rules of the local bridge. The data structure may include metadata for each of the one or more rules, including a time until expiration, a priority, a condition, and an action. In some embodiments, the rules are sorted in terms of their priority for the corresponding packet identifier or destination address. In some embodiments, upon receiving the first local packet, the local bridge identifies the packet identifier or destination address associated with the first local packet, maps the packet identifier or destination address to the one or more rules, and executes, in the sorted order, the one or more rules (e.g., execute actions corresponding to a subset of the one or more rules whose conditions are met).

In some embodiments, the local bridge receives a request (e.g., from a user VM such as the first user VM) to operate as a standard L2 (or standard L3) bridge. In some embodiments, response to receiving the request to operate the standard L2 bridge, the local bridge disables the software rules. In some embodiments, response to receiving the request to operate the standard L2 bridge, the local bridge generates a rule that emulates, or causes the local bridge to emulate, standard L2 bridge behavior or operations (e.g., send to other VMs packets destined for the other user VMs, send to the MUX bridge packets destined for external servers, such as external server 250a). In some embodiments, all of the bridges receive the same request and all of the bridges disable the corresponding software rules or generating corresponding software rules that result in the software defined bridge chain emulating a standard L2 bridge chain.

In some embodiments, the local bridge includes a network segment. In some embodiments, the packet passes the single network segment when being forwarded, transmitted, sent, switched, or otherwise passed from the first user VM to the service-focused bridges (e.g., via the MUX bridge). In some embodiments, the packet passes through the same network segment when being forwarded, transmitted, sent, switched, or otherwise passed from the service-focused bridges (e.g., via the MUX bridge) to the second user VM. In some embodiments, the first user VM and the second user VM share the network segment. That is, a first packet sent from the first user VM directly goes directly from the user first user VM to the network segment before going to a service-focused bridge or another user VM and a second packet sent from the second user VM goes directly from the second user VM to the network segment before going to a service-focused bridge or another user VM.

In some embodiments, the multiplexing bridge combines the data received from the local bridge and other local bridges, e.g., local bridges 210a-210d. In some embodiments, the multiplexing bridge splits the data received from the service-focused bridges.

In some embodiments, the second user VM is in a second host different from the first host. In some embodiments, the default rules and generated rules apply to packets destined to user VMs of another host (e.g., the condition of the rules is met if the packets are destined to user VMs of the another host). In some embodiments, the default rules and generated rules apply to packets destined to any user VM that is part of the same cluster of hosts or the same datacenter as the first user VM.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An apparatus comprising: a processor; and
a memory having programmed instructions to:
determine that a first packet, received from a first virtual machine (VM) on a first host, has a destination address associated with a second VM on the first host;
send the first packet to a service-focused bridge;
generate a rule to redirect the first packet to the second VM based on the destination address;
execute the rule in response to receiving the first packet from the service-focused bridge;
receive, from the first VM, a request to operate as a standard layer 2 bridge; and
responsive to receiving the request to operate as the standard layer 2 bridge, generate a second rule that causes the apparatus to emulate operations of the standard layer 2 bridge.

2. The apparatus of claim 1, wherein the apparatus includes one network segment and the first packet passes through the one network segment when being received from the first VM and when being sent to the second VM.

3. The apparatus of claim 1, wherein the destination address associated with the second VM on the first host is one of a medium access control (MAC) address and a virtual local area network (VLAN) identifier (ID).

4. The apparatus of claim 1, wherein the service-focused bridge is one of a network security rules bridge and a network function bridge.

5. The apparatus of claim 1, wherein sending the first packet to the service-focused bridge is a default rule.

6. The apparatus of claim 1, wherein the processor has further programmed instructions to send the first packet to the service-focused bridge, via a multiplexer bridge.

7. A method for dynamic medium access control (MAC) learning comprising:
determining, by a processor, that a first packet, received from a first virtual machine (VM) on a first host, has a destination address associated with a second VM on the first host;
sending, by the processor, the first packet to a service-focused bridge;
generating, by the processor, a rule to redirect the first packet to the second VM based on the destination address;
executing, by the processor, the rule in response to receiving the first packet from the service-focused bridges;
receiving, by the processor and from the first VM, a request to operate as a standard layer 2 bridge; and
responsive to receiving the request to operate as the standard layer 2 bridge, generating, by the processor, a second rule that causes a local bridge associated with the processor to emulate operations of the standard layer 2 bridge.

8. The method of claim 7, wherein a local bridge associated with the processor includes one network segment and the first packet passes through the one network segment when being received from the first VM and when being sent to the second VM.

9. The method of claim 7, wherein the destination address associated with the second VM on the first host is one of a medium access control (MAC) address and a virtual local area network (VLAN) identifier (ID).

10. The method of claim 7, wherein the service-focused bridge is one of a network security rules bridge and a network function bridge.

11. The method of claim 7, wherein sending the first packet to the service-focused bridge is a default rule.

12. The method of claim 7, wherein the processor has further programmed instructions to send the first packet to the service-focused bridge, via a multiplexer bridge.

13. A non-transitory computer readable storage medium with computer-executable instructions embodied thereon that, when executed by a processor, causes the processor to perform a process comprising:
determining that a first packet, received from a first virtual machine (VM) on a first host, has a destination address associated with a second VM on the first host;
sending the first packet to a service-focused bridge;
generating a rule to redirect the first packet to the second VM based on the destination address;
executing the rule in response to receiving the first packet from the service-focused bridges;
receiving from the first VM, a request to operate as a standard layer 2 bridge; and responsive to receiving the request to operate as the standard layer 2 bridge, generating a second rule that causes a local bridge associated with the processor to emulate operations of the standard layer 2 bridge.

14. The non-transitory storage medium of claim 13, wherein a local bridge associated with the processor includes one network segment and the first packet passes through the one network segment when being received from the first VM and when being sent to the second VM.

15. The non-transitory storage medium of claim 13, wherein the destination address associated with the second VM on the first host is one of a medium access control (MAC) address and a virtual local area network (VLAN) identifier (ID).

16. The non-transitory storage medium of claim 13 wherein the service-focused bridge is one of a network security rules bridge and a network function bridge.

17. The non-transitory storage medium of claim 13, wherein sending the first packet to the service-focused bridge is a default rule.

18. The non-transitory storage medium of claim 13, wherein the processor has further programmed instructions to send the first packet to the service-focused bridge, via a multiplexer bridge.

* * * * *